United States Patent
Ardö

(10) Patent No.: US 12,141,940 B2
(45) Date of Patent: Nov. 12, 2024

(54) METHOD AND IMAGE-PROCESSING DEVICE FOR EVALUATING AN ALIGNMENT OF STITCHED IMAGES

(71) Applicant: Axis AB, Lund (SE)

(72) Inventor: Björn Ardö, Lund (SE)

(73) Assignee: AXIS AB, Lund (SE)

( * ) Notice: Subject to any disclaimer, the term of this patent is extended or adjusted under 35 U.S.C. 154(b) by 411 days.

(21) Appl. No.: 17/558,594

(22) Filed: Dec. 22, 2021

(65) Prior Publication Data
US 2022/0245760 A1  Aug. 4, 2022

(30) Foreign Application Priority Data
Feb. 1, 2021 (EP) .................................... 21154578

(51) Int. Cl.
*G06T 3/4038* (2024.01)
*G06T 7/80* (2017.01)

(52) U.S. Cl.
CPC .............. *G06T 3/4038* (2013.01); *G06T 7/80* (2017.01); *G06T 2200/32* (2013.01); *G06T 2207/20221* (2013.01)

(58) Field of Classification Search
CPC ..... G06T 3/4038; G06T 7/80; G06T 2200/32; G06T 2207/20221; G06T 2207/10021; G06T 2207/30168; G06T 2207/30232; G06T 7/38; G06T 7/0002; G06T 3/047; G06T 5/70; G06T 7/30; H04N 5/265; H04N 7/181; H04N 23/45; H04N 23/6845; H04N 23/698; H04N 25/60; H04N 17/02; H04N 7/18; H04N 23/54
See application file for complete search history.

(56) References Cited

U.S. PATENT DOCUMENTS 8,509,565 B2 * 8/2013 Chen ..................... G06V 10/24
382/128
8,600,193 B2  12/2013 Kalayeh
(Continued)

FOREIGN PATENT DOCUMENTS

EP    3142045 A1    3/2017

OTHER PUBLICATIONS

Diego et al., "Joint Spatio-Temporal Alignment of Sequences", IEEE Transactions On Multimedia, vol. 16, No. 6, Oct. 2013, pp. 1377-1387.

*Primary Examiner* — Tom Y Lu
(74) *Attorney, Agent, or Firm* — XSENSUS LLP

(57) ABSTRACT

A method includes aligning a first image frame of a first stream of images from a first image sensor and a further first image frame of a second stream of images from a second image sensor according to a first alignment, aligning a second image frame of the first stream of images and a further second image frame of the second stream of images according to the first alignment, obtaining a first stitched image frame by blending the aligned first image frame and further first image frame in a first blending area according to a first blending function, obtaining second stitched image frame by blending the aligned second image frame and the further second image frame in a second blending area according to a second blending function, and evaluating the first alignment from a difference pattern calculated from pixel values of the first stitched frame and the second stitched frame.

13 Claims, 10 Drawing Sheets

(56) References Cited

U.S. PATENT DOCUMENTS

| | | | |
|---|---|---|---|
| 9,076,238 B2* | 7/2015 | Wu | G06T 5/50 |
| 9,740,959 B2* | 8/2017 | Opdenbosch | G06T 5/50 |
| 9,767,387 B2* | 9/2017 | Chaki | G06V 10/70 |
| 10,469,725 B2* | 11/2019 | Prasad | H04N 23/60 |
| 10,863,105 B1* | 12/2020 | Rosengaus | G06V 10/60 |
| 10,970,556 B2* | 4/2021 | Teich | H04N 23/57 |
| 11,265,481 B1* | 3/2022 | Rosengaus | G06F 18/251 |
| 2018/0084226 A1* | 3/2018 | Prasad | H04N 13/296 |

* cited by examiner

METHOD AND IMAGE-PROCESSING DEVICE FOR EVALUATING AN ALIGNMENT OF STITCHED IMAGES

CROSS-REFERENCE TO RELATED APPLICATION

This application claims priority to European Patent Application No. 21154578.5 filed on Feb. 1, 2021, the entire disclosure of which is incorporated by reference herein.

TECHNICAL FIELD

The embodiments herein relate to a method and an image-processing device for evaluating an alignment of stitched images. A corresponding computer program and a computer program carrier are also disclosed.

BACKGROUND

Surveillance of the public using imaging, in particular video imaging, is common in many areas around the world. Areas that may need monitoring are for example banks, stores, and other areas where security is needed, such as schools and government facilities. Other areas that may need monitoring are processing, manufacturing and logistics applications where video surveillance is primarily used to monitor processes.

For some applications, large fields of view of the video are required, at least occasionally. This can be achieved by several means. For example, single-sensor cameras can be equipped with a pan-tilt-zoom technology that moves the camera and changes the field of view. This solution is usually rather costly compared to a fixed camera. Single-sensor fisheye cameras provide panoramic views at affordable prices, but are limited in the ability to get more detail at greater distances. Another solution is to use multi-sensor panoramic cameras where panoramic images are produced by stitching the single-sensor images.

Image stitching or photo stitching is the process of combining multiple photographic images with overlapping fields of view to produce one uniform image e.g., a segmented high-resolution, possibly panoramic, image. For example, image data from overlapping image sensors may be blended using different weights in the portions where there is an overlap between the images from the sensors. Commonly performed with software, most approaches to image stitching require nearly exact overlaps between images and identical exposures to produce seamless results. It is important that the images from the sensors are correctly aligned in the overlap portions. If not correctly aligned, errors, such as part of the same object appearing twice in the overlap, or portions of an object missing, may appear.

In general, alignment errors may e.g., be categorized as translational alignment errors, rotational alignment errors and alignment errors due to skew. Other alignment errors also exists.

The alignment between the images may be found from knowledge of the mounting positions of the sensors, or from analyzing the separate images to be stitched to find common features and use these for alignment and/or warping of the images. One way of aligning the original images is to create a table which maps the coordinates in the original images to their new coordinates in the final image. These tables may depend on certain parameters of the camera, such as parameters relating to mounting positions of the sensors. The parameters may be pre-installed in the camera after a factory calibration and later fed by the camera. Even though the factory calibration usually results in minor alignment errors, alignment of the original images may still need some adjustment when the camera is installed in the field. For example, adjustment of the alignment may be needed if the camera has been mechanically disturbed during transportation, or if the field environment is significantly different from the test environment in the factory, or if the objects that are captured in the field are not at a similar distance as the objects used for calibration of the alignment at the factory.

Even if a re-adjustment may be performed when the camera has been installed in the field, such re-adjustment may need to be determined offline, i.e., not in run-time/live view of the camera, which means that the image stream from the camera cannot be used for a certain time.

A problem of alignment methods performed during run-time of the camera is that they may require separate image streams for evaluation of the alignment. For example, the unaligned images may be evaluated. Such alignment methods require extra complexity and processing power, and possibly extra bandwidth on a network on which such data is sent, compared to if no alignment was performed.

Other alignment methods performed during run-time of the camera may affect the quality of the stitched images. A lowered quality of the stitched images may have a negative effect on the video processing taking place after the stitching, and in the end may be perceived as lower quality images by the end viewer.

Prior art U.S. Pat. No. 8,600,193B2 discloses a method to stitch images including evaluation of a stitching quality.

SUMMARY

An object of embodiments herein may thus be to obviate some of the problems mentioned above, or at least reduce the impact of them. Specifically, an object may be to dynamically improve an alignment of stitched images, or in other words to dynamically calibrate the stitching of images, captured by multiple image sensors, in run-time of an image-processing device performing the stitching operation. The image-processing device may be a camera. Performing the calibration in run-time of the image-processing device may mean to perform the calibration while the image-processing device is in use.

As part of the improvement of the alignment or calibration an evaluation of the alignment which may comprise a determination of a degree or a quality of alignment, such as a determination of a size, type and/or direction of an alignment or misalignment error may be performed. The expressions degree of alignment and quality of alignment and alignment quality will be used interchangeably herein and have the same meaning. Similarly, the expressions alignment error and misalignment error will also be used interchangeable herein.

According to an aspect, the object is achieved by a method performed by an image-processing device, such as an image-capturing device. The method may be for evaluating an alignment of stitched images from two image sensors having overlapping fields of view, e.g. for evaluating alignment of a first stream of images from a first image sensor and a second stream of images from a second image sensor, wherein the first and second image sensors have overlapping fields of view. The image sensors may be comprised in the image-capturing device.

The method comprises aligning a first image frame of a first stream of images from the first image sensor and a further first image frame of a second stream of images from the second image sensor according to a first alignment, and aligning a second image frame of the first stream of images and a further second image frame of the second stream of images according to the first alignment.

The method further comprises obtaining a first stitched image frame by blending the aligned first image frame and further first image frame in a first blending area of the first and further first image frames according to a first blending function, and obtaining a second stitched image frame by blending the aligned second image frame and the further second image frame in a second blending area of the second and further second image frames according to a second blending function which differs from the first blending function.

The method further comprises evaluating the first alignment based on a difference pattern calculated based on values of pixels of the first stitched frame and the second stitched frame. The pixels are comprised within at least one static part of the first and second blending areas in the respective first and second stitched image frames.

According to another aspect, the object is achieved by an image-processing device configured to perform the above method.

According to further aspects, the object is achieved by a computer program and a computer program carrier corresponding to the aspects above.

Since the difference pattern is based on the at least one static part the difference pattern is not dependent on movements in the scene between different images taken after each other. Instead, the difference pattern is dependent on the variation in blending function and on the alignment. The variation in blending function will have the least effect on the difference pattern for the most aligned images. For example, for blending functions where the sum of the blending functions of the first and the further first images equals the sum of the blending functions of the second and the further second images the different blending functions should result in a zero difference pattern for perfectly aligned images. For images that have misalignment errors the different blending functions will produce non-zero difference patterns.

Therefore, since the first stitched frame and the second stitched frame have been stitched using different blending functions, and the difference pattern is based on the at least one static part it is possible to dynamically evaluate and improve the alignment of the stitched images by evaluating the first alignment based on the difference pattern calculated based on values of pixels of the first stitched image frame and the second stitched image frame.

A further advantage of embodiments herein is that they allow evaluation of the alignment during run-time of the image-processing device such that dynamic re-calibration of the alignment can be performed without shutting down the operation of the image-processing device. In particular, the evaluations of alignments that are good enough will have very little impact on the resulting video stream and thus will not be noticed by the end viewer.

Further, since the difference pattern can be computed from the stitched image stream there is no need for a separate image stream for evaluating the alignment.

Yet a further advantage of embodiments herein is that they allow to simplify evaluation of complex non-linear misalignment errors in the stitched image, such as rotations of the original images that are stitched, by evaluating the misalignment as a translational misalignment in many small static parts which are spread over the blending areas.

BRIEF DESCRIPTION OF THE DRAWINGS

In the figures, features that appear in some embodiments are indicated by dashed lines.

The various aspects of embodiments disclosed herein, including particular features and advantages thereof, will be readily understood from the following detailed description and the accompanying drawings, in which.

DETAILED DESCRIPTION

Figure 1:
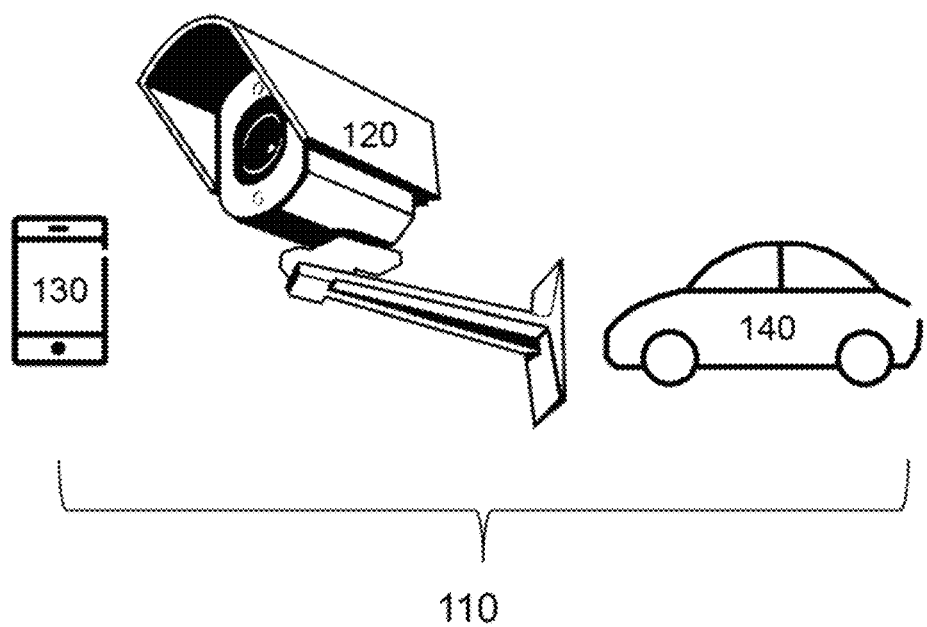
FIG. 1 is a schematic overview illustrating exemplifying embodiments of an image-processing device, such as an image-capturing device, herein.

As mentioned above it may be of interest to improve the alignment of stitched images from two or more sensors. As an example, alignment can be determined at the factory, e.g. from knowledge of the mounting positions of the sensors.

However, alignment of the original images may still need some adjustment when a camera is installed in the field.

As mentioned above a problem of alignment methods performed during run-time of the camera is that they may require one or more separate image streams for evaluation of the alignment.

In embodiments herein, these problems are solved by a method of evaluating alignment of two streams of images from sensors with overlapping fields of view. More specifically these problems may be solved by dynamically improving an alignment of stitched images by embedding information which can be used for analysis of the alignment in the stitched image stream, i.e., in the image stream of the stitched images.

The embedded information is obtained by varying a blending function of the original images that are stitched and then evaluating the alignment, e.g. by determining a degree or quality of alignment, by computing a difference pattern, or in other words a difference image, between two stitched images, each formed by blending two images emanating from the image sensors. For example, the difference pattern may be computed by computing a difference based on corresponding pixel values of the two stitched images. In some embodiments herein the difference pattern is computed by computing a difference between weighted pixel values of the two stitched images. In some embodiments the weights are equal to one such that the difference pattern is computed by computing a difference between the pixel values of the two stitched images.

In some embodiments herein evaluating the alignment based on the difference pattern comprises comparing the difference pattern for a first alignment with a difference pattern for one or more further alignments, such as a second alignment. Then the alignment resulting in a minimum difference pattern may be selected. For those embodiments the difference pattern may be computed by computing a difference between the pixel values of the two stitched images.

In some other embodiments a difference pattern, such as a single difference pattern, is used as input to a neural network together with one of the stitched images that was used to produce the difference pattern. After an initial training the neural network is able to evaluate the alignment based on the difference pattern and the stitched image.

In yet some other embodiments the difference pattern is used (together with one of the stitched images) to compute a reconstruction of the original images within the static part. Then evaluating the alignment may be based on any known method for extracting differences and/or similarities between these original images and evaluate these differences and/or similarities. Such feature matching methods may include sum of squared differences (SSD), Normalized Cross Correlation (NCC), or Scale-Invariant Feature Transform (SIFT).

In other words, embodiments herein improve the alignment of stitched image frames in run-time of an image-processing device, such as a camera, by varying a blending function, or in other words a blending factor or a blending weight of stitched image frames and study the effect of this variation on the difference pattern in a static part, such as a small patch of 8×8 pixels, of a blending area comprised in an overlapping area between the original images. The static part is a part which is invariant between different image frames if the blending function is the same.

If the original images are well aligned, the variation in blending should have minimal effect on the stitched images, but if the original images are not well aligned, the variation in blending will cause a variation in pixel values in the static part of the overlapping image area. That is, the variation in blending will cause different stitched images blended with different blending functions to be different, that is to comprise different pixel values at corresponding pixel positions. A difference based on the pixel values at corresponding pixel positions can be monitored and evaluated and a determination of whether or not the alignment is good enough can be made based on the evaluation of the difference.

An advantage of embodiments herein is that the variation is not so large as to be very noticeable for a viewer of the stitched images. Further, embodiments herein allow to simplify evaluation of complex non-linear misalignment errors in the stitched image, such as rotations of the original images that are stitched, by evaluating the misalignment as a translational misalignment in many small static parts which are spread over the blending areas.

Embodiments herein may be implemented in one or more image-processing devices, such as an image-capturing device, e.g. a digital camera. FIG. 1 depicts various exemplifying image-capturing devices 110. The image-capturing device 110 may e.g. be a camcorder, a video recorder, a video camera 120 such as a surveillance camera or a monitoring camera, a digital camera, a smartphone 130 including an image sensor, or a car 140 including an image sensor.

Figure 2:
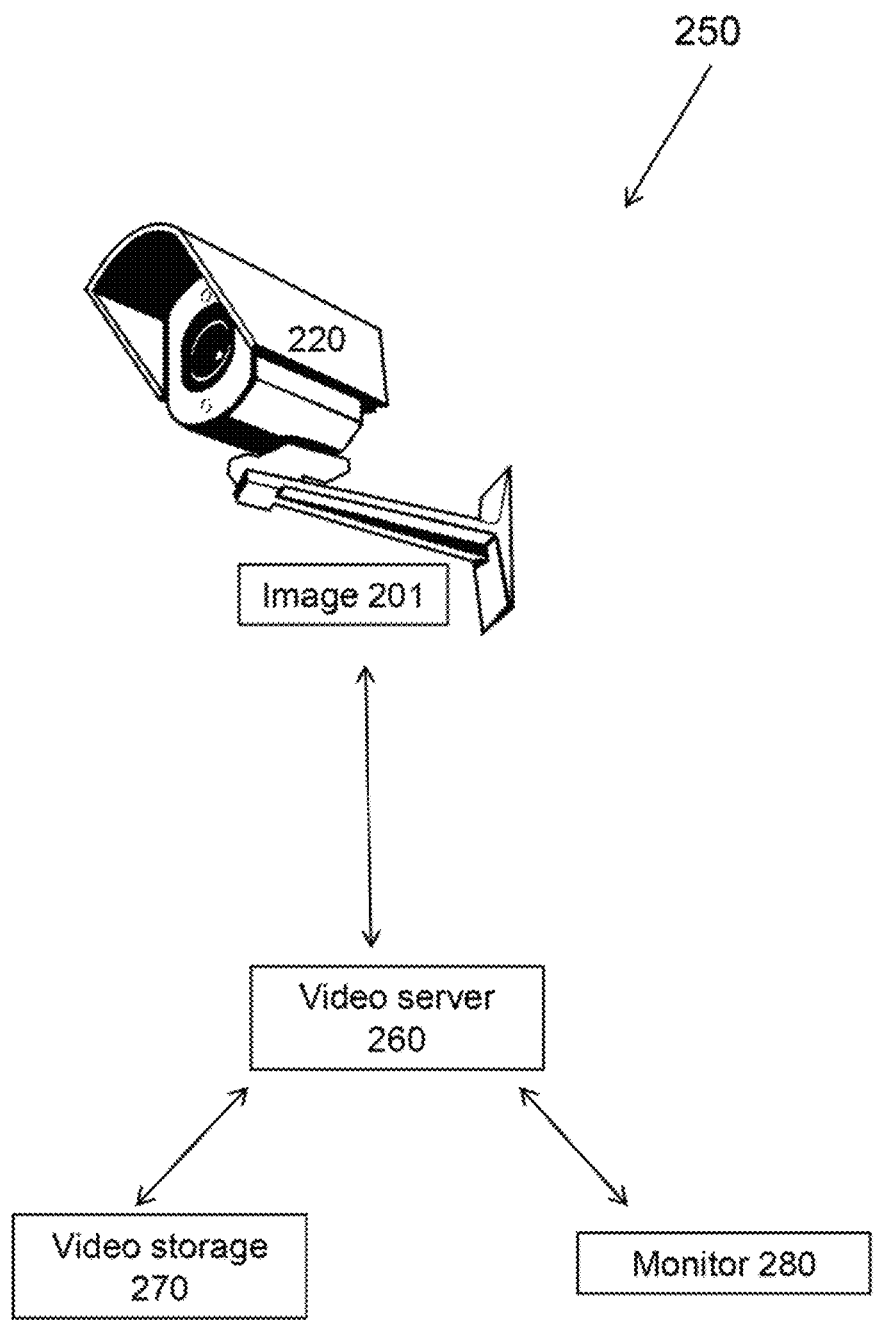
FIG. 2 illustrates exemplifying embodiments of a video network system comprising image-processing devices.

FIG. 2 depicts an exemplifying video network system 250 in which embodiments herein may be implemented. The video network system 250 may include the video camera 120, 220 which can capture and perform image processing on a digital image 201, such as a digital video image. A video server 260 in FIG. 2 may obtain the image, for example from the video camera 120, 220 over a network or the like.

A video server is a computer-based device that is dedicated to delivering video. Video servers are used in a number of applications, and often have additional functions and capabilities that address the needs of particular applications. For example, video servers used in security, surveillance and inspection applications typically are designed to capture video from one or more cameras and deliver the video via a computer network. In video production and broadcast applications, a video server may have the ability to record and play recorded video, and to deliver many video streams simultaneously. In FIG. 2, the video server 260 is connected over the network 250, to the image-capturing device exemplified by the video camera 120, 220. The video server 260 may further be connected to a video storage 270 for storage of video images, and/or connected to a monitor 280 for display of video images.

Embodiments herein may be implemented in several image-processing devices. For example, in some embodiments herein the method of evaluating alignment of two streams of images is performed in a distributed manner in both an image-capturing device, such as the video camera 120, 220, and one or more further image-processing devices, such as the video server 250. The one or more further image-processing devices may also be comprised in a Video Management System (VMS), or a computer cloud. More specifically, some parts of the method, such as aligning and blending the images may be performed by the image-capturing device, while other parts like evaluating the alignment may be performed by the one or more further image-processing devices. This is possible since the information related to the blending is embedded with the image stream that leaves the image-capturing device.

In order to better understand embodiments herein an imaging system will first be described.

Figure 3A:
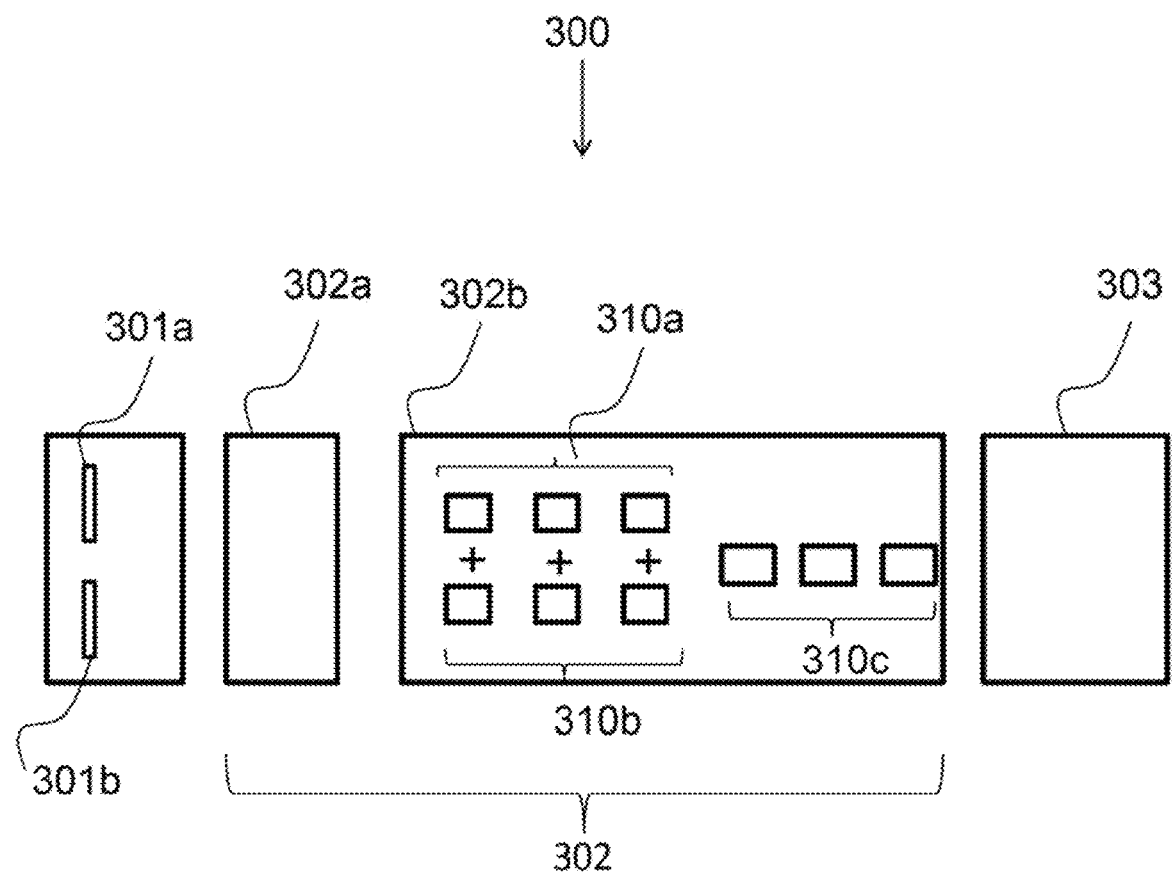
FIG. 3a is a schematic overview illustrates exemplifying embodiments herein.

FIG. 3a is a schematic view of an imaging system 300, in this case of a digital video camera, such as the video camera 120, 220. The imaging system images a scene on one or more image sensor, e.g. on a first image sensor 301a and on a second image sensor 301b. The first and second image sensors 301a, 301b may be provided with a respective Bayer filter, such that different pixels will receive radiation of a particular wavelength region, in a known pattern. Typically, each pixel of a captured image is represented by one or more values representing the intensity of the captured light within a certain wavelength band. These values are usually referred to as colour components, or colour channels. The term "image" may refer to an image frame or video frame including information originating from an image sensor that has captured the image.

After having read the signal of individual sensor pixels of the image sensors 301a, 301b, different image processing actions may be performed by an image processing pipeline 302. Typically for video processing the images are comprised in a stream of images. FIG. 3a illustrates a first stream of images 310a from the first image sensor 301a and a second stream of images 310b from the second image sensor 301b.

Image processing may comprise demosaicing, color correction, noise filtering (for eliminating spatial and/or temporal noise), distortion correction (for eliminating effects of, e.g., barrel distortion), global and/or local tone mapping (e.g., enabling imaging of scenes containing a wide range of intensities), transformation (e.g., rectification and rotation), flat-field correction (e.g., for removal of the effects of vignetting), application of overlays (e.g., privacy masks, explanatory text), etc. The image processing pipeline 302 may also be associated with an analytics engine performing object detection, recognition, alarms, etc.

The image processing pipeline 302 may comprise an image processing part 302a and a video post-processing part 302b. The image processing part 302a may e.g. perform image stabilization, apply noise filtering, distortion correction, global and/or local tone mapping, transformation, and flat-field correction. The video post-processing part 302b may for example crop parts of an image, apply overlays, and comprise the analytics engine.

Specifically, in embodiments herein processing of the image will also comprise stitching two images from the first and second image sensors 301a, 301b together. Stitching may be performed relatively late in the image processing pipeline 302, e.g. in the video post-processing part 302b. In some embodiments, at least noise filtering has been performed before stitching is performed. FIG. 3a schematically illustrates how the first and second image streams 310a, 310b are combined to form a stitched image stream 310c.

Figure 3B:
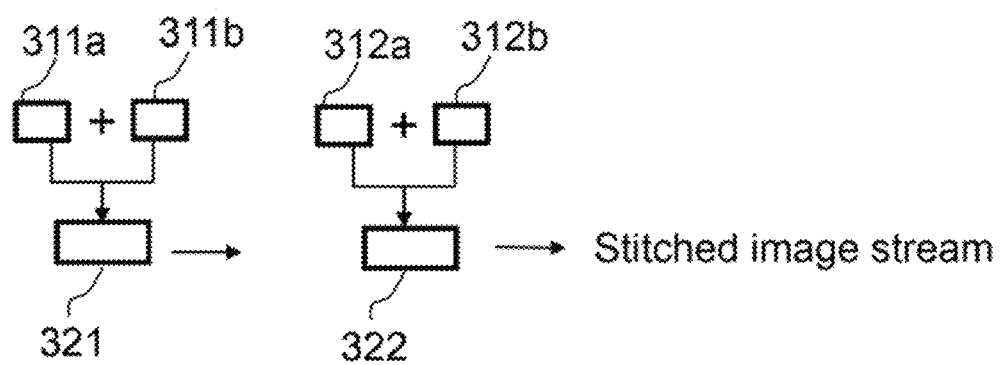
FIG. 3b is a schematic overview illustrating exemplifying embodiments herein.

FIG. 3b schematically illustrates such image stitching processes, wherein in a first such stitching process a first image frame 311a and a further first image frame 311b originating from the respective first and second image sensors 301a, 301b, are stitched to produce a first stitched image frame 321. In a second such stitching process a second image frame 312a and a further second image frame 312b originating from the respective first and second image sensors 301a, 301b, are stitched to produce a second stitched image frame 322. The first image frame 311a and the further first image frame 311b may have been captured at the same or similar time points in order to achieve as little variation as possible between the two image frames 311a, 311b due to movements of objects in the scene captured by the image frames. Similarly, the second image frame 312a and the further second image frame 312b may also have been captured at the same or similar time points.

More than two frames may also be stitched together.

It should be noted that for video cameras an outgoing frame rate from the video camera, e.g. a rate corresponding to the display rate of the image frames on a display, such as 30 fps or 60 fps, may set limitations to the time that can be spent on image processing, specifically if live video-streams are needed. Embodiments herein can be performed without lowering the frame rate. Specifically, the variation of the blending function can be performed without affecting the frame rate of the stitched images.

Following the image processing pipeline 302 the image may be forwarded to an encoder 303, wherein the information in the image frames is coded according to an encoding protocol, such as H.264, and forwarded to for example a receiving client, exemplified here with the monitor 280, the video server 260, the storage 270, etc.

Figure 3C:
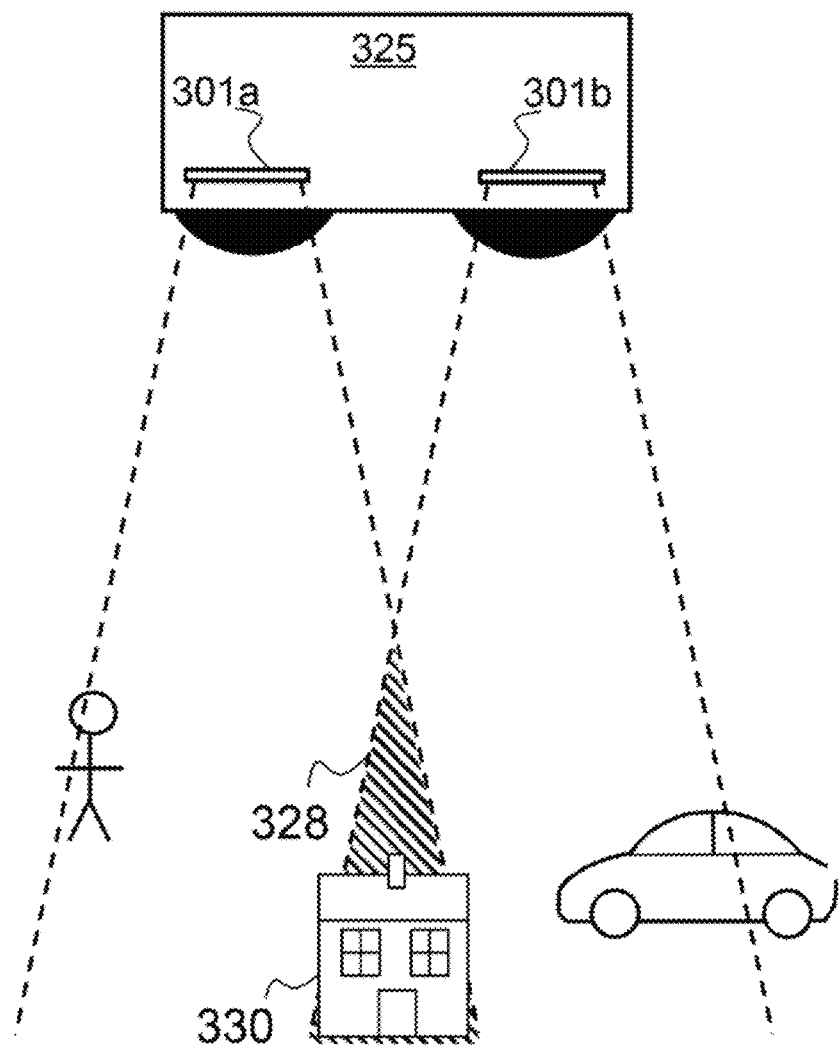
FIG. 3c is a schematic overview illustrating exemplifying embodiments herein.

An exemplifying scenario and exemplifying embodiments herein will now be described with reference to FIG. 3c. FIG. 3c illustrates an example image-processing device, in the form of a video camera 325 and a scene comprising several objects. The video camera 325 may comprise the imaging system 300 of FIG. 3a discussed above. For example, the video camera 325 may comprise the first image sensor 301a and the second image sensor 301b. The first and second image sensors have an overlapping field of view 328, illustrated in FIG. 3c with a hatched area. Within the overlapping field of view 328 a static object 330 is placed, and thus at least a part of the static object 330 is imaged onto both the first image sensor 301a and the second image sensor 301b.

Exemplifying methods according to embodiments herein will now be described with reference to FIG. 3d, FIG. 3e and FIG. 3f and to a flowchart of FIG. 4, and with further reference to FIGS. 3a-3c.

In order to stitch two image frames the image frames are aligned. An initial alignment may have been performed at the factory. However, re-alignment may be necessary from time to time when the image-processing device has been installed in the field and is running. Thus, the following will present a method for such re-alignment, or re-calibration of the alignment. The re-calibration of the alignment comprises an evaluation of the current alignment or misalignment, which may include determining a degree of alignment and/or calculating a misalignment error.

Embodiments of a method for evaluating alignment of two streams of images from sensors with overlapping fields of view will now be described. First a less detailed description of some specific embodiments will be described in order to explain how the different actions interplay.

The method may comprise the following actions:

1. arranging the first and further first image frames 311a, 311b according to a first alignment and preparing the first stitched image frame 321 by blending the aligned first and further first image frames 311a, 311b in a first blending area 331a; The first blending area 331a in which the aligned first and further first image frames 311a, 311b are blended is comprised in a first overlapping area 332a of the aligned first and further first image frames 311a, 311b. The first overlapping area 332a may be defined as a respective area of the first and further first image frames 311a, 311b comprising pixels with corresponding content of the scene.

2. selecting a plurality of static parts 334a, 334b of the first blending area 331a in the stitched image frames 321, 322, and for each such static part 334a, 334b, determine the quality of alignment by
   a. for the second stitched image frame 322 increasing the blending weight for one of the second and further second images 321a, 312b in a second blending area 331b by a certain amount, e.g., 10%, and decrease the weight of the other image frame by a corresponding amount. The second blending area 331b in which the aligned first and further first image frames 311a, 311b are blended is comprised in a second overlapping area 332b of the aligned second and further second image frames 311a, 311b;
   b. calculating a difference pattern based on values of pixels of the second stitched image frame 322 and the first stitched image frame 321 in the static parts 334a, 334b of the blending area 331a, 331b. For example, calculating a difference pattern between the second stitched image frame 322 and the first stitched image frame 321 in the static parts 334a, 334b of the blending area 331a, 331b 3. evaluating the difference patterns to determine a hypothesis regarding an improved alignment, wherein the evaluation comprises in a first version:
   a. if the difference pattern is greater than zero, the alignment is not perfect, select another alignment and test again;

b. if the difference pattern equals zero, the alignment is fine, evaluation is completed
c. wherein the evaluation comprises in a second version
  i. using a pretrained neural network to determine an improved alignment based on the difference patterns and the stitched image 321, 322 in the blending area 331a, 331b.

In the following a more detailed description of each action will be given. The methods herein for evaluating an alignment of stitched images from two image sensors having overlapping fields of view, or in other words for evaluating alignment of two streams of images from two image sensors having overlapping fields of view, such as for evaluating alignment of the first stream of images 310a from the first image sensor 301a and the second stream of images 310b from the second image sensor 301b, may be implemented in an image-processing device, such as any of the image-capturing devices 110 of FIG. 2a, and in particular the video camera 325 of FIG. 3c. The image sensors 301a, 301b may be comprised in the image-capturing device 110, such as the video camera 325.

As mentioned above, even though the factory calibration may have been performed, alignment of the original images may still need some adjustment when the video camera 325 is installed in the field. Implementation of embodiments herein in the video camera 325 is of particular relevance when performed in run-time of the video camera 325, since they can be performed in the video camera 325 without providing separate image streams for evaluation of the alignment and with minor effects on the stitched image stream. Thus, the method may be performed without majorly impacting the normal use of the image-processing device.

One or more of the following actions presented in FIG. 4 may be performed in the following exemplifying order. In other examples, the order may differ from what is described below.

Action 401a

Figure 3D:
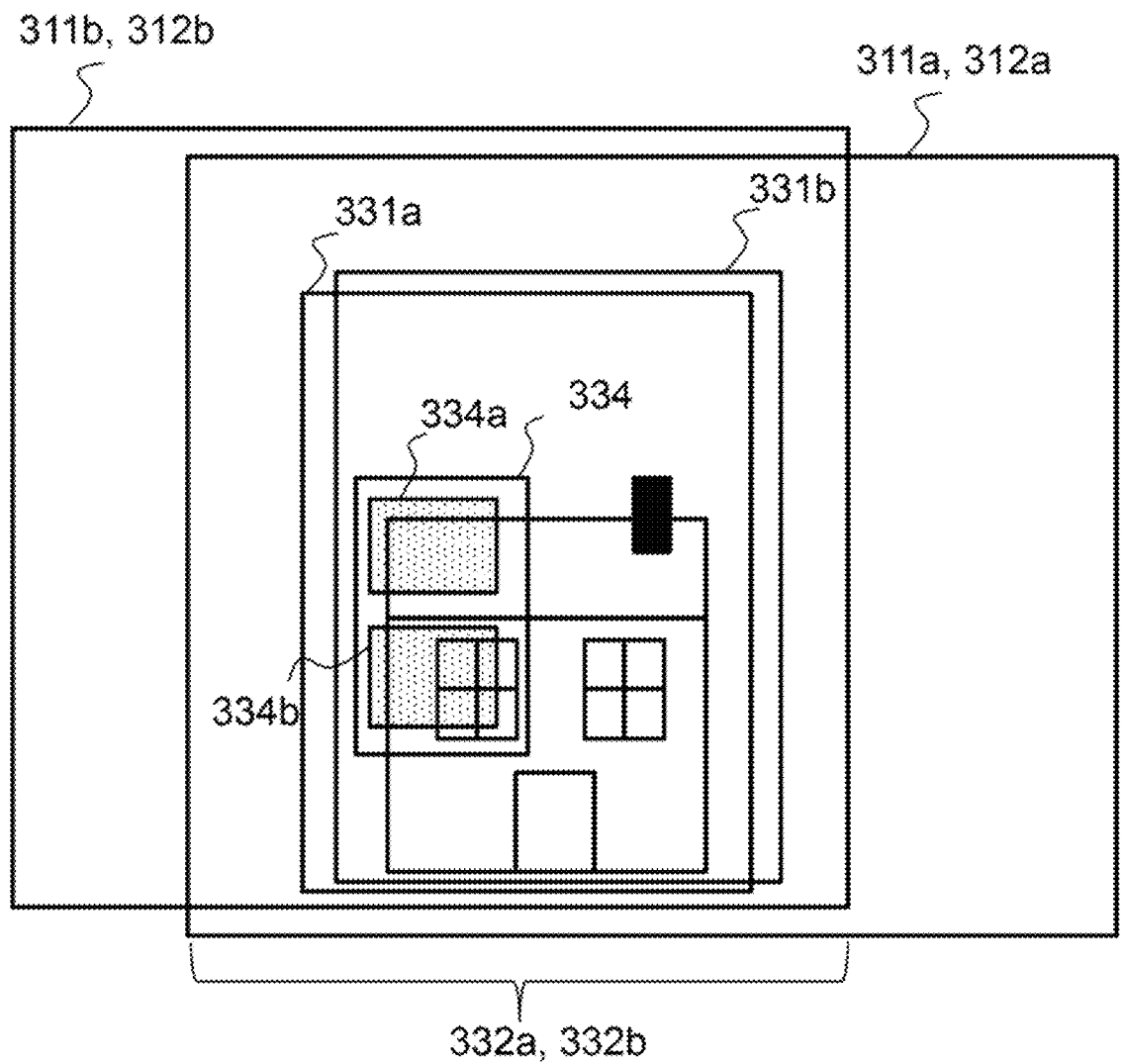
FIG. 3d illustrates exemplifying embodiments of stitching of two image frames.
Figure 4:
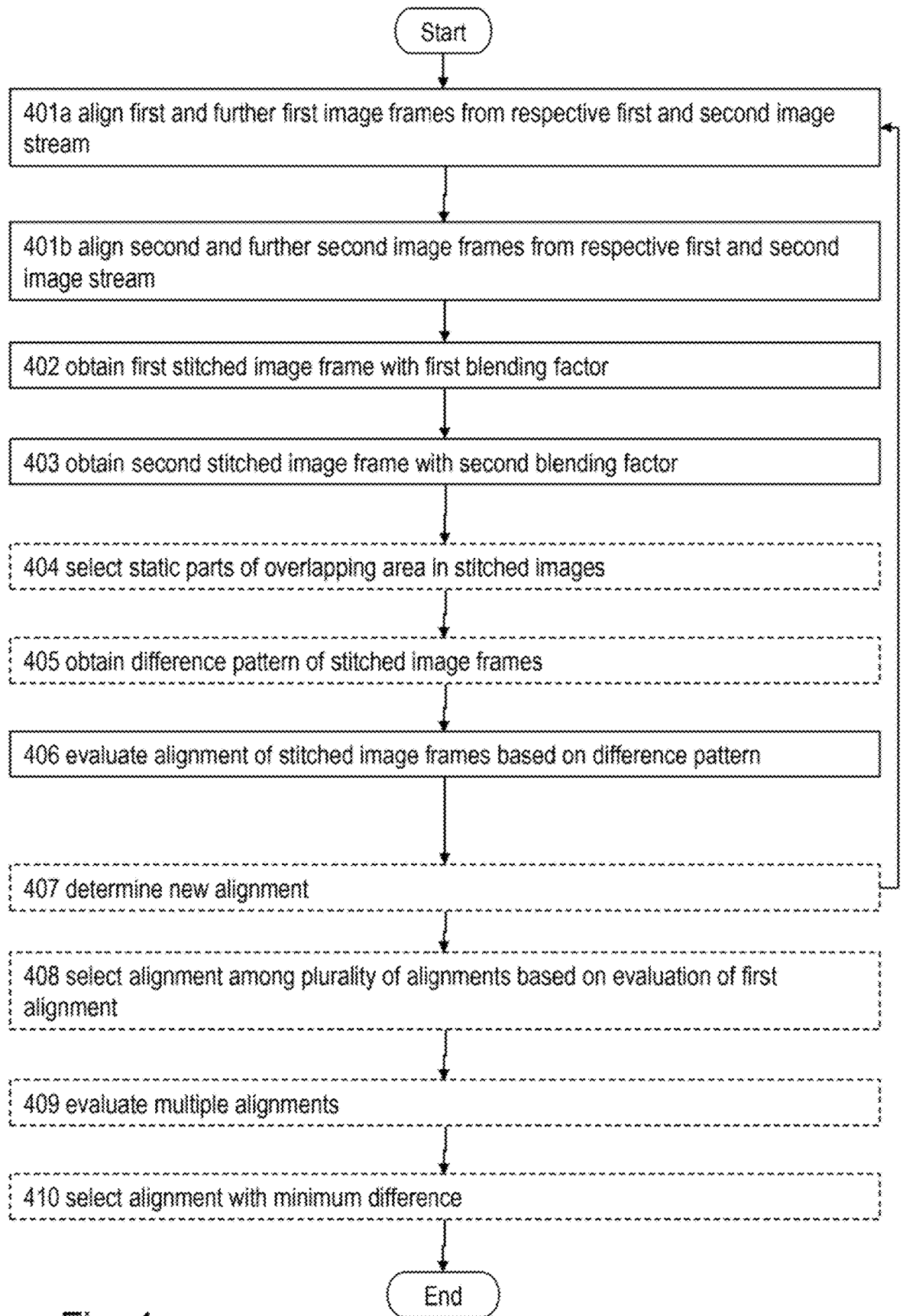
FIG. 4 is a flowchart illustrating embodiments of a method in an image-processing device.

FIG. 3d schematically illustrates overlay of two image frames originating from two image sensors according to some alignment with some alignment error. The two image frames may for example be the first image frame 311a and the further first image frame 311b. In another example the two image frames are the second image frame 312a and the further second image frame 312b.

As mentioned above, a calculation or determination of an alignment to be used for stitching the first image frame 311a and the further first image frame 311b may have been performed before the method for evaluating the alignment begins, e.g. at the factory. For example, it is possible to use a table which maps the coordinates in the original images 311a, 311b to their new coordinates in the stitched image 321. Some other embodiments use another table which maps the coordinates in the stitched image 321 to coordinates the original images 311a, 311b. These tables may depend on certain parameters of the video camera 325, such as parameters relating to mounting positions of the sensors 301a, 301b. Thus, action 401a and the next action 401b aligns two image frames according to a known or determined alignment, without any evaluation and updating of the alignment. In other words, action 401a and 401b combines or overlays the two image frames according to the known or determined alignment. This is part of the normal stitching process. The evaluation of the alignment is performed in action 406 below.

In FIG. 3d the alignment error is exemplified with a translational misalignment in a vertical pixel direction. Other misalignments such as rotational and/or skewing misalignments may also occur, and the below description of embodiments herein is equally applicable to such other misalignment errors. In more detail FIG. 3d illustrates overlay or alignment of the first image frame 311a of the first stream of images 310a from the first image sensor 301a and the further first image frame 311b of the second stream of images 310b from the second image sensor 301b according to a first alignment. The first alignment is associated with a first alignment error. The first image frame 311a and the further first image frame 311b may have been captured at the same or similar time points such that the variation between the two image frames 311a, 311b, e.g. due to movements of objects in the scene, is as small as possible within the first blending area 331a. Since embodiments herein take advantage, or phrased differently, make an analysis of such variations in the stitched images that are caused by differences in the blending process it is desirable to have as little variation as possible due to movements of objects in the scene.

Thus, in order to stitch the first image frame 311a and the further first image frame 311b they are aligned according to the first alignment.

Action 401b In a corresponding manner as in action 401a above the image-processing device aligns the second image frame 312a of the first stream of images 310a from the first image sensor 301a and the further second image frame 312b of the second stream of images 310b from the second image sensor 301b according to the first alignment.

The second image frame 312a and the further second image frame 312b may have been captured at the same or similar time points such that the variation between the two image frames 312a, 312b, e.g. due to movements of objects in the scene, is as small as possible within the second blending area 331b. However, in relation to the first and further first image frames 311a, 311b the second image frame 312a and the further second image frame 312b may have been captured at a different point in time, such as a later point in time.

Action 402

Figure 3E:
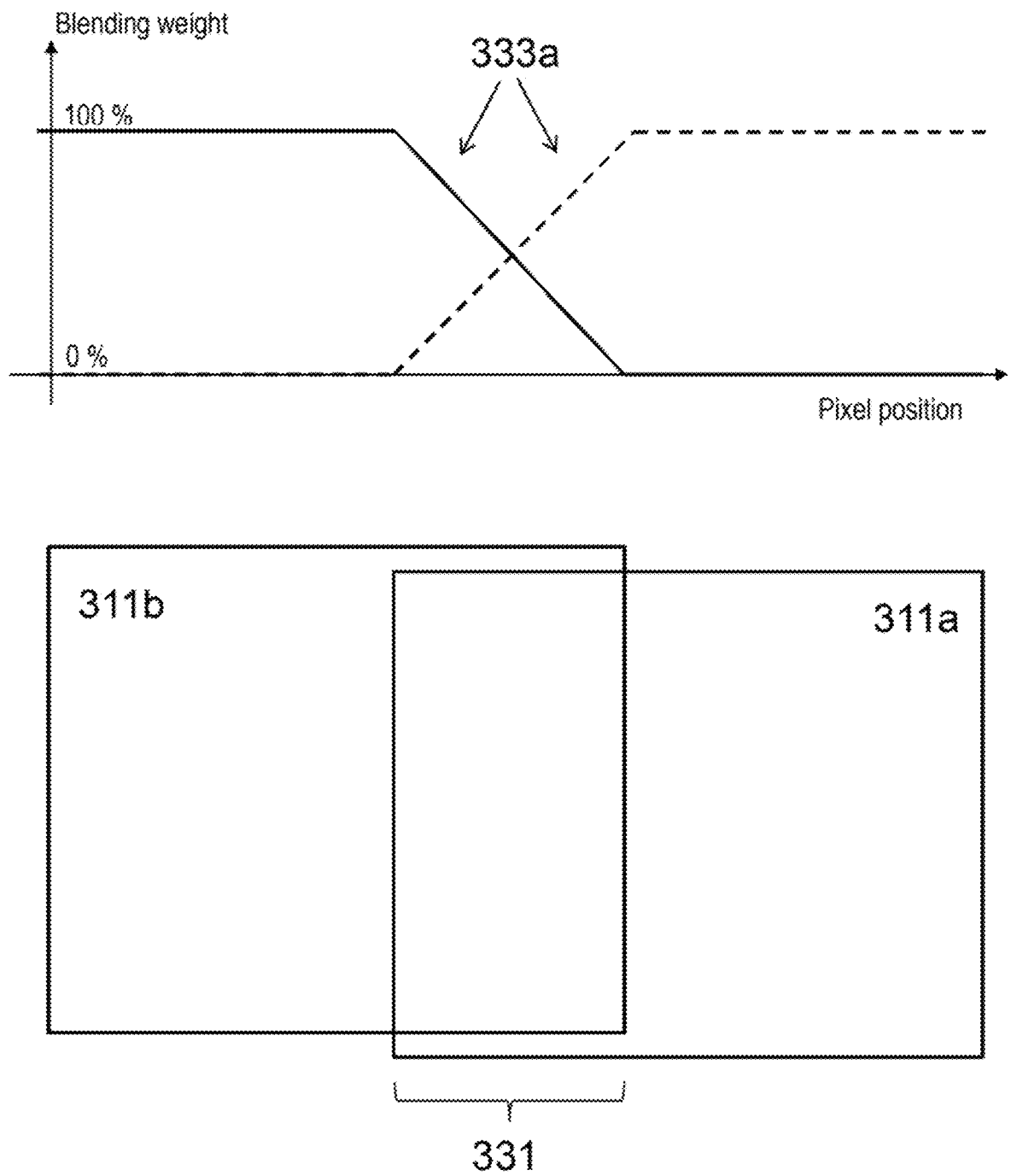
FIG. 3e illustrates exemplifying embodiments of a blending function.

When the first image frame 311a and further first image frame 311b have been aligned or combined, e.g. according to actions 401a and 401b above, the image-processing device obtains the first stitched image frame 321 by blending the aligned first image frame 311a and further first image frame 311b in the first blending area 331a of the first and further first image frames 311a, 311b according to a first blending function 333a, an example of which is illustrated in FIG. 3e.

In embodiments herein a blending function may define respective blending weights or blending factors of an image frame blended with a further corresponding image frame as a function of a pixel position within a blending area of the images. Thus, the blending function may comprise multiple respective functions defining respective blending weights of the two corresponding image frames. In particular, the first blending function 333a may define a respective blending weight of the aligned first image frame 311a and the further first image frame 311b as a function of a pixel position in the first blending area 331a.

The blending function may be any know blending function, e.g. an alpha blending function.

There are several versions of alpha blending, but a common concept is that each pixel is weighted using a blending function e.g., a linear blending function. Each pixel is then prioritized depending on where in each respective blending area 331a, 331b or where in each respective static part 334a,

334b it is located. An example implementation uses a mask and multiplies each static part 334a, 334b with either the mask or 1-mask.

Alpha blending is used to make the transitions between two images smoother. However, this also implies that the edges and artifacts that are present in incorrect stitching are smoothed as well. This may make it difficult to detect them, and even more so their respective magnitude. However, since embodiments herein evaluates the alignment based on the difference pattern calculated based on values of pixels of two stitched images which difference is due to the variation in the blending function it is possible to detect these errors also for the alpha blending.

An advantage of using the alpha blending function for evaluating the alignment based on the difference pattern is that the difference pattern is calculated with the same function for each pixel, which means that the value of the total difference for the static part 334 is based on the sum of differences of the respective pixels. An example will now follow. The example assumes that the sum of the blending weights for a particular pixel for the first stitched image frame 321 is the same as the sum of the blending weights for the same pixel for the second stitched image frame 322. The sum may for example correspond to 1, or 100%.

In FIG. 3e the first blending function 333a is a linearly varying function within the first blending area 331a shown below the first blending function 333a in FIG. 3e. In this example the linearly varying function comprises a linear variation of the respective blending weight of the first and further first image in percent as a function of a horizontal pixel position within the first blending area 331a. A first blending weight, illustrated with a hatched line in FIG. 3e, may be applied to the first image frame 311a, while a further first blending weight, illustrated with a solid line in FIG. 3e, may be applied to the further first image frame 311b.

According to FIG. 3e the first blending weight is 100% for pixel positions within the first image frame 311a with no overlap with the further first image frame 311b, i.e. at the right side of the blending area 331a in FIG. 3e. For pixel positions within the blending area 331a the first blending weight varies from 100% at the pixel position where the further first image frame 311b ends to 0% at the pixel position where the first image frame 311a ends. Then the first blending weight is 0% for pixel positions within the further first image frame 311b with no overlap with the first image frame 311a.

The further first blending weight for the further first image frame 311b can be defined correspondingly to the above.

Now for a specific pixel position in the static part 334 of the first stitched image frame 321 the first blending weight applied to the first image frame 311a may be 30%. Then for the same pixel position the further first blending weight applied to the further first image frame 311b may be 70%. For the corresponding second stitched image frame 322 and the second blending function the second blending weight applied to the second image frame 312a may be 40%. Then for the same pixel position the further second blending weight applied to the further second image frame 312b may be 60%.

The first blending function 333a may also be described as comprising multiple blending functions, e.g. a respective blending function corresponding to the first image frame and the further first image frame.

Action 403

In a corresponding manner as in action 401a above the image-processing device 110 obtains the second stitched image frame 322 by blending the aligned second image frame 312a and the further second image frame 312b in the second blending area 331b of the second and further second image frames 312a, 312b according to a second blending function 333b which differs from the first blending function 333a. FIG. 3f illustrates examples of both the first blending function 333a, illustrated with solid lines in combination with hatched lines, and the second blending function 333b, illustrated with dotted lines in combination with dot-hatched lines, as function of a pixel position.

Similar as for the first blending function 333a, the second blending function 333b may define a respective blending weight of the aligned second image frame 312a and the further second image frame 312b as a function of a pixel position in the second blending area 331b.

In embodiments herein the first overlapping area 332a may cover the same pixels as the second overlapping area 332b. The first and second overlapping areas 332a, 332b are illustrated in FIG. 3f with an unbroken horizontal line under the pixel position axis. Even so, the first blending area 331a may differ from the second blending area 331b. The second blending area 331b may for example be translated in relation to the first blending area 331a. In some embodiments herein the respective blending area 331a, 331b is defined as an overlapping area which overlaps a linear variation of the blending weights of the blending function.

Figure 3F:
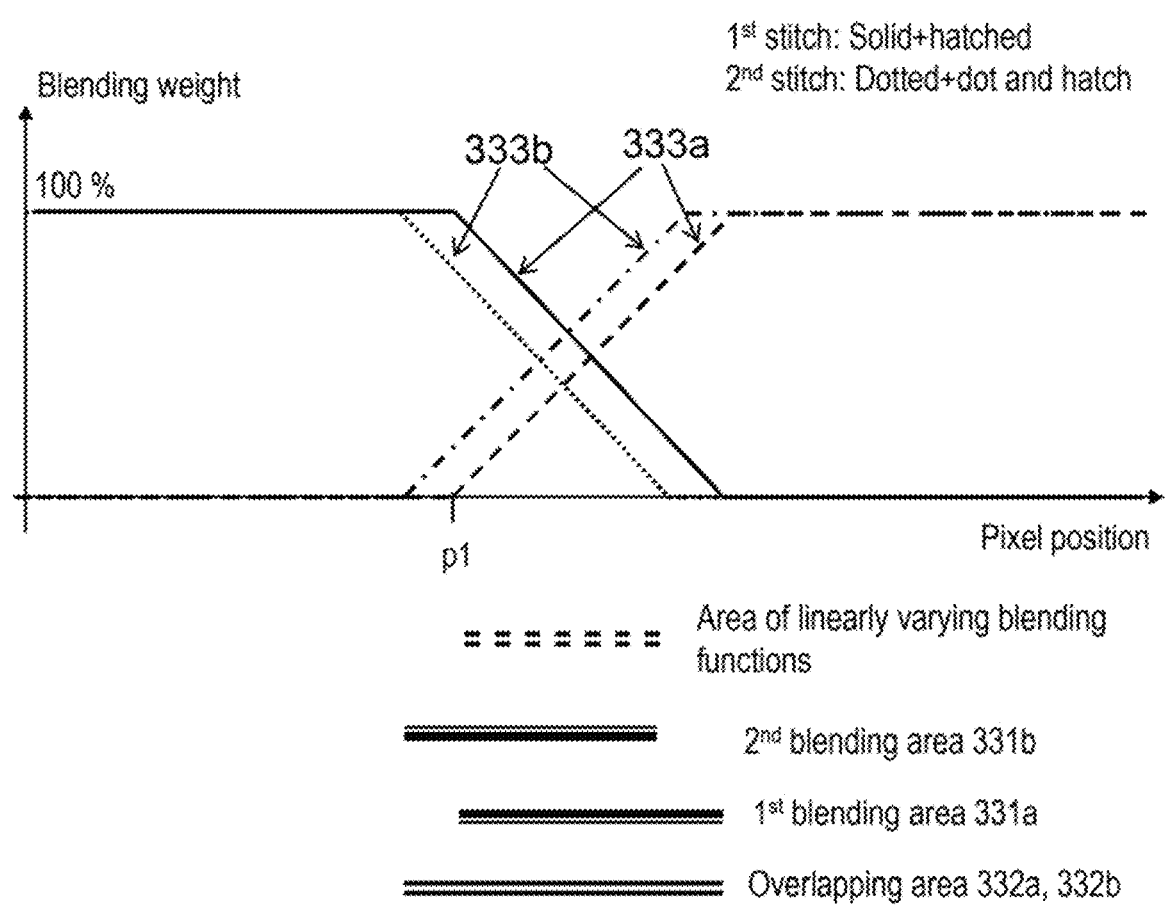
FIG. 3f illustrates exemplifying embodiments of multiple blending functions.

In FIG. 3f different areas are illustrated as horizontal lines of different types which are placed under the horizontal pixel position axis.

The first blending area 331a is illustrated with a thick horizontal line with a thin horizontal line under the thick line, while the second blending area 331b is illustrated with a thick horizontal line with a thin horizontal line above the thick horizontal line. However, it is also possible that the second blending area 331b covers the same area as the first blending area 331a. For example, the second blending area 331b and the first blending area 331a may be defined to cover the whole overlapping area 332a, 332b which is illustrated with two thick solid lines.

In any case, an area covering linearly varying parts of the first and the second blending areas 331a, 331b, illustrated with two thick hatched horizontal lines, may be used for evaluating the alignment, e.g., for calculating the difference pattern.

A second blending weight, illustrated with a dot-hatched line in FIG. 3f, may be applied to the second image frame 311b, while a further second blending weight, illustrated with a dotted line in FIG. 3f, may be applied to the further second image frame 312b.

As illustrated in FIG. 3f the second blending function 333b may differ from the first blending function in that the second blending weight applied to the second image frame 312a is higher than the first blending weight applied to the first image frame 311a within the blending area 331a, while the further second blending weight applied to the further second image frame 312b is lower than the further first blending weight applied to the further first image frame 311b within the blending area 331a. This may be obtained by translating parts of the first and second blending functions 333a, 333b which vary linearly relative to each other. This means that the overlapping area 332a, 332b may be bigger than the first and second blending areas 331a, 331b used for blending. The static parts 334a, 334b may then be determined such that they are comprised in a part of the stitched images 321, 322 which only comprises linearly varying blending functions. That is, parts of the overlapping area which comprise static blending functions may be discarded. For example, the second blending weight may vary between 10% and 100% within the second blending area 331*b*, while the first blending weight varies between 0% and 100% within the corresponding first blending area 331*a*. Likewise, the further second blending weight may vary between 90% and 0% within the second blending area 331*b*, while the first blending weight varies between 100% and 0% within the corresponding first blending area 331*a*.

According to some embodiments herein the variation in blending weight is selected or determined such that the total pixel value within the blending areas remain the same for the first and second stitched frames. For example, the sum of the blending weights for a pixel position p1 may be constant between the first stitched image frame 321 and the second stitched image 322. If the second blending weight is increased compared to the first blending weight from 0% to 10% for the pixel position p1, then the further second blending weight may be decreased from 100% to 90% for the same pixel position p1.

Thus, the resulting pixel value of the first stitched frame 321 may be the same or roughly the same as the resulting pixel value of the second stitched frame 322 for the same pixel position.

Action 404

In order for the method to exclude pixel variation due to movements of moving objects in the scene, at least one static part 334 of the blending areas 331*a*, 331*b* may be determined and/or selected. The static part 334 may also be referred to as a patch.

The at least one static part 334 may comprise a part of the first blending area 331*a* of the first and further first image frames 311*a*, 311*b* which is invariant with respect to the second blending area 331*b* of the second and further second image frames 312*a*, 312*b* if the second blending function 333*b* does not differ from the first blending function 333*a*. In embodiments herein invariant comprises a case with no variation at all but may also comprise a case with a small variation which is smaller or equal to a noise level of the original image frames.

In order to make the calculation of the difference pattern less complex the static part 334 may be chosen from an area of the blending area 331*a*, 331*b* where there is a positive blending weight for both the blended image frames.

As mentioned above, embodiments herein allow to simplify evaluation of complex non-linear misalignment errors in the stitched image frames 321, 322, such as rotations of the original images 311*a*, 311*b*, 312*a*, 312*b* that are stitched, by evaluating the misalignment as a local translational misalignment in many small static parts 334 which are spread over the blending area 331*a*, 331*b*. Thereby the complexity of the calculation of the misalignment error is reduced.

Therefore, in some embodiments the at least one static part 334 comprises multiple static parts 334*a*, 334*b*, such as a first static part 334*a* and a second static part 334*b*. More static parts, such as three or four or even more are also possible. Each static part 334*a*, 334*b* may comprise a small number of pixels, such as 8×8 or 16×16 pixels. The size of the static parts, be it multiple or single static parts, may be limited to a certain size limit. For example, the size of the static parts may be limited in order to be able to linearise complex alignment errors into linear alignment errors.

Limitations in the processing capabilities of the image-processing device may also set a limit to how big the static parts may be. However, there is a trade-off in size of the static parts in relation to being able to determine the error significantly over any noise. Bigger static parts means more statistical points which can be used to average out the noise.

Further, the static part 334 should be bigger than the linear alignment error that is to be determined.

As mentioned above, by having multiple static parts an improved evaluation of the alignment is possible. The multiple static parts 334*a*, 334*b* may be advantageous compared to a single static part 334 when the misalignment is due to a rotation or a skew. For example, by using multiple static parts 334*a*, 334*b* to evaluate an alignment the evaluation may comprise information on multiple alignment freedoms, such as linear alignment in two directions and/or rotation and/or skew. For example, an evaluation of a respective multiple static part 334*a*, 334*b* may comprise a different respective evaluation result, such as a different respective measure of a difference pattern, or a different sign of the difference. By analysing difference patterns from multiple static parts 334*a*, 334*b* it is possible to draw conclusions based on the different measures and/or signs of the multiple difference patterns. For example, different signs of the difference pattern from two static parts located on different sides of a centre line may indicate that a rotation is causing the misalignment. Thus, a combined evaluation of the different respective measures of the respective multiple static part 334*a*, 334*b* may improve the evaluation of the misalignment compared to an evaluation of a single static part. As mentioned above, by having many small static parts 334*a*, 334*b* complex misalignment errors can be evaluated based on evaluating linear translational misalignment in each static part 334*a*, 334*b* which is less complex.

Further, for some misalignments, such as for rotational misalignments, a size of a smallest misalignment error that can be determined with embodiments herein, may depend on a distance between the pixels used for the evaluation. For example, the smallest misalignment error that can be determined may depend on a distance between the first static part 334*a* and the second static part 334*b*. In a scenario a small rotation is assumed, for example 0.1 degree.

It is further assumed that the size of the static parts, be it multiple or single static parts, is limited to a certain size limit, for example due to limitations in the processing capabilities of the image-processing device. For example, the size of the static parts 334*a*, 334*b* may be limited to 16×16 pixels. Thus, each static part 334*a*, 334*b* may comprise 16×16 pixels. In this scenario there is a big advantage of using the multiple static parts 334*a*, 334*b* with some distance between them instead of a single static part 334. The distance between the multiple static parts 334*a*, 334*b* may be selected based on the size of the original image frames 311*a*, 311*b*, 312*a*, 312*b* and the number of multiple static parts 334*a*, 334*b* used. For example, the distance may be selected such that the area over which the multiple static parts 334*a*, 334*b* are distributed is maximised.

In order to find the 0.1-degree rotational misalignment with the single static part of 16×16 pixels, embodiments herein may need to be able to detect a misalignment within the single static part 334 in the order of a couple of hundredth pixels (couple of $\frac{1}{100}$ pixels). Instead, if there is a distance of 500 pixels between the multiple static parts 334*a*, 334*b*, then embodiments herein may need to be able to detect a misalignment between the multiple static parts 334*a*, 334*b* in the order of 1 pixel. The detection of the misalignment between the multiple static parts 334*a*, 334*b* may be performed by comparing an absolute translational error difference between two static parts 334*a*, 334*b*. How to determine such a translational error will be briefly described below in action 406. Further, by using multiple static parts 334*a*, 334*b* statistical measures of the difference patterns may be used when evaluating the alignment quality, which will reduce the impact from noise.

Action 405

The evaluation of the first alignment is based on a difference pattern based on the first stitched frame 321 and the second stitched frame 322. The image-processing device 110 may obtain the difference pattern in order to evaluate the first alignment. The image-processing device 110 may obtain the difference pattern by calculating the difference pattern.

The difference pattern is calculated based on the values of corresponding pixels of the first stitched frame 321 and the second stitched frame 322. The corresponding pixels relate to a same pixel position in the first and second stitched image frames 321, 322. The pixels of the first stitched frame 321 and the second stitched frame 322 are comprised within the at least one static part 334 of the first and second blending areas 331a, 331b in the respective first and second stitched image frames 321, 322. Thus, the difference pattern is based on the at least one static part 334.

In some embodiments the difference pattern is calculated based on a difference between the values of corresponding pixels of the first stitched frame 321 and the second stitched frame 322.

In some other embodiments the difference pattern is calculated based on a difference between weighted values of corresponding pixels of the first stitched frame 321 and the second stitched frame 322.

The difference pattern may comprise a measure of pixel difference of the at least one static part 334 of the blending areas 331a, 331b. In other words, the measure of pixel difference may be a measure of a difference between the first blending area 331a and the second blending area 331b.

In some embodiments the measure of pixel difference is based on a difference based on values of corresponding pixels of the first stitched frame 321 and the second stitched frame 322. For example, the measure of pixel difference may be based on a difference between values of corresponding pixels of the first stitched frame 321 and the second stitched frame 322. The difference between the values of corresponding pixels of the first stitched frame 321 and the second stitched frame 322 may be a difference between weighted values. In other words, the measure of pixel difference may be based on weighted values of corresponding pixels of the first stitched frame 321 and the second stitched frame 322.

In some other embodiments where the evaluation of the first alignment comprises reconstruction of the original image frames 311a, 311b, 312a, 312b the reconstruction may be based on the measure of pixel difference. For such embodiments evaluation of the first alignment may be further based on a further difference pattern which is based on a difference between values of corresponding pixels of a respective reconstruction of the first image frame 311a and the further first image frame 311b within the at least one static part 334.

As mentioned above, the evaluation of the first alignment may be further based on feature matching of the original image frames. In some embodiments the further difference pattern may be based on the feature matching. For example, a further measure of pixel difference may be based on the difference between values of corresponding pixels of the respective reconstruction of the first image frame 311a and the further first image frame 311b. For all examples of calculating the pixel difference above, the measure of pixel difference may comprise

- a value describing a size of the pixel difference, e.g. within a same range used for the original pixel values of the original image frames 311a, 311b, 312a, 312b, e.g. within the range 0-255. The size of the pixel difference may for example be used when evaluating several alignments, or in other words when evaluating several sets of alignment parameter. Then the sizes of the different alignments can be compared, and the smallest pixel difference can be selected.
- a vector, e.g. describing the size and a direction of the pixel difference, e.g. in which direction there is an increase of the pixel difference. Such embodiments are well suited to be used together with a neural network to find suitable alignment parameters from a single difference pattern which is also described below in action 408.
- a difference in single pixel values of the first and second stitched image frames 321, 322, e.g. the measure of pixel difference may comprise a respective measure of pixel difference for a respective pixel. For example, the measure of pixel difference may comprise a value of three for a first pixel and a value of five for a second pixel, while the measure of pixel difference of the other pixels results in a zero difference.
- A difference based on weighted pixel values.
- a statistical measure, such as an average, of the pixel difference of the first and second stitched image frames 321, 322 over the static part 334
- a statistical measure, such as an average, of the pixel difference of the first and second stitched image frames 321, 322 over the multiple static parts 334a, 334b
- any combination of the above examples The difference pattern will be used below in action 406 as a measure of how good the alignment is, or in other words as a measure of the alignment error. As mentioned above, the difference pattern of a specific static part 334a, 334b may be used to determine a measure of a local alignment error.

Action 406

The image-processing device 110 evaluates the difference pattern in order to determine if a re-alignment is needed or not.

In some first embodiments the image-processing device 110 evaluates the first alignment and if it is not satisfactory, then it continues to evaluate other alignments. For example, other parameters of the camera for mapping the original images into the stitched images are selected and further evaluations of these alignments are performed in a trial-and-error fashion. For example, the difference pattern for a first alignment may be compared with a difference pattern for one or more further alignments, such as a second alignment. Then the alignment resulting in a minimum difference pattern may be selected. For those embodiments the difference pattern may be computed by computing a difference between the pixel values of the two stitched images. This is also discussed below in action 409.

In some second embodiments the image-processing device 110 evaluates the first alignment and based on the result determines an improved, preferably optimal, alignment, for example using a pretrained neural network. For example, a difference pattern, such as a single difference pattern, is used as input to the neural network together with one of the stitched images 321, 322 that was used to produce the difference pattern. After an initial training the neural network is able to evaluate the alignment based on the difference pattern and the stitched image 321, 322. This is also discussed below in action 408.

In some third embodiments the difference pattern is used, together with one of the stitched images 321, 322, to compute a respective reconstruction of the original images 311a, 311b or 312a, 312b within the static part 334. Then evaluating the first alignment based on the difference pattern comprises calculating a respective reconstruction of the first image frame 311a and the further first image frame 311b based on the difference pattern and further based on either of the values of corresponding pixels of the first stitched frame (321) or the second stitched frame (322). The calculation is performed for pixels within the at least one static part 334. The evaluation may further comprise comparing the respective reconstruction with each other. In other words, the respective reconstruction is based on the corresponding pixel values of the first stitched frame 321 and the second stitched frame 322 within the blending areas 331a, 331b and further based on the first blending function 333a and the second blending function 333b. Since it is assumed that the static part 334 is invariant between the first image frame 311a and the second image frame 312a, a reconstructed first image frame of the first stream of images 310a should comprise the same pixel values as a reconstructed second image frame of the first stream of images 310a. This means that the evaluation of the first alignment may further be based on values of corresponding pixels of a respective reconstruction of the second image frame 312a and the further second image frame 312b.

As mentioned above in action 405 the difference pattern used to reconstruct the original image frames may be calculated based on a difference between weighted values of corresponding pixels of the first stitched frame 321 and the second stitched frame 322.

An advantage with evaluating the first alignment further based on the values of the pixels of the reconstructed image frames is that such evaluation may be based on any known method for extracting differences and/or similarities between these original images and evaluate these differences and/or similarities by e.g., comparing and/or matching the first and the further first images 311a, 311b, or the second and further second images 312a, 312b. As mentioned above, such matching methods may include SSD, NCC, or SIFT. Such algorithms may also be used to adjust the alignment should the first alignment not be good enough The following example will outline details of how to evaluate the first alignment based on the reconstruction of the original images 311a, 311b or 312a, 312b. Let R1 be a value of a right pixel of the first image frame 311a in the static part 334 of the first blending area 331a. L1 is a value of a corresponding left pixel of the further first image frame 311b in the static part 334 of the first blending area 331a. The following assumes blending with alpha blending as explained above. a is a blending weight for the right pixel value R1. (a−1) is a blending weight for the left pixel value L1. C1 is a value of a pixel of the first stitched image frame 321 corresponding to pixels values R1 and L1. C2 is a value of a pixel of the second stitched image frame 322 corresponding to pixel values R2 and L2, where R2 is a value of a right pixel of the second image frame 312a in the static part 334 of the second blending area 331b and L2 is a value of a corresponding left pixel of the further second image frame 312b in the static part 334 of the second blending area 331b. It is further assumed that the blending weight is adjusted for the second image frame 312a by +10% to (a+0,1) for R2 and the blending weight is correspondingly adjusted for the further second image frame 312b by −10% to (1−a−0.1) for L2. Since the pixel positions are comprised in the static part 334 it can be assumed that R1=R2, and L1=L2. This results in the following linear equation system:

$a*R1+(1-a)*L1=C1$ (first blend)

$(a+0.1)*R1+(0.9-a)*L1=C2$ (second blend)

By solving the equation system R1 and L1 can be found for each pixel in the static part 334. The blending weight a will be a function of the pixel position. This means that it is possible to calculate or reconstruct the values of the pixels of the original blended images within the static part 334. Calculating R1 and L1 is based on the difference pattern based on corresponding pixel values of the first and second stitched image frames 321, 322. The difference pattern may be calculated based on a difference between the values of corresponding pixels of the first stitched frame (321) and the second stitched frame (322). For example, R1 and L1 may be calculated based on the difference image C1−C2=0,1*(R1−L1) in combination with values of the pixels of the first stitched image frame 321 given by C1=a*R1+(1-a)*L1). As can be seen from the formula the difference value C1−C2 is described by the same formula for all the other pixel positions as well. Since the alpha-blending results in a difference image C1-C2 that is directly dependent on R1 and L1 it is possible to exactly reconstruct the original images within the static part 334 based on the above with this blending method.

The area covered by both the first and the second blending areas 331a, 331b may be used for calculating the original image frames. An advantage of using the above-mentioned area for the reconstruction is that the original image frames will be reconstructed with the same precision within this area.

As mentioned above, by reconstructing the original images, known algorithms for feature identification, description and matching, such as SSD, may be used to match features in the corresponding original image frames, specifically to match features in parts of the original image frames corresponding to the static parts 334a, 334b. For example, a first feature in the first image frame 311a can be matched to a corresponding further first feature in the further first image frame 311b. Likewise, a second feature in the second image frame 311a can be matched to a corresponding further second feature in the further second image frame 312a. In a further example of evaluating the alignment based on the reconstructed original images the alignment error may be +2 pixels in a first direction and −3 pixels in a second perpendicular direction for a particular static part 334a. After a possible averaging over the static parts 334a, 334b a small adjustment of the alignment may be taken in a direction of the derivative or differential of the alignment error. An evaluation of the new alignment can then be compared to the old alignment.

Thus, for all embodiments above the image-processing device 110 evaluates the first alignment based on the difference pattern calculated based on values of pixels of the first stitched frame 321 and the second stitched frame 322. As mentioned above when describing action 405 the difference pattern is based on the at least one static part 334. That is, the pixels of the first stitched frame 321 and the second stitched frame 322 are comprised within the at least one static part 334 of the first and second blending areas 331a, 331b in the respective first and second stitched image frames 321, 322.

In some embodiments herein the image-processing device 110 evaluates the first alignment by calculating the difference pattern. For example, the image-processing device 110 may evaluate the first alignment by determining a degree of alignment of the first alignment based on the difference pattern. The degree of alignment is a measure of how good the alignment is. In other words, the degree of alignment may be a measure of the alignment quality, or alternatively the misalignment or misalignment error.

Evaluating the first alignment based on the difference pattern may further comprise comparing the difference pattern with a threshold value or with a pre-determined difference pattern. For example, the threshold value may be a threshold average value of the pixel difference of the first and second stitched image frames 321, 322 over the static part 334. The threshold value may be related to a noise level in the stitched image 321, 322. That is, if the difference pattern is above the threshold then it may be determined that the difference pattern is not just noise.

In some embodiments evaluating the first alignment comprises calculating a measure of alignment quality, such as the degree of alignment, which is increased with a decrease in the difference pattern. The decrease in the difference pattern may correspond to a decrease of an absolute value of the pixel difference.

The degree of alignment may be determined by comparing the difference pattern with a threshold value. For example, if the difference pattern is above zero, it is determined that the alignment is not perfect. Then the method may continue with selecting a new alignment and evaluating the new alignment, e.g. by determining a degree of alignment of the new alignment, based on the new difference pattern. This is described below in action 407.

However, if the difference pattern is zero, or close to zero, it may be determined that the alignment is fine, and the evaluation is completed.

As mentioned above, if the images are well aligned, the variation in blending should have minimal effect on the static part of the resulting stitched image. Thus, the difference pattern is a good measure of the degree of alignment or misalignment, an alignment quality, or a measure of misalignment, of the images being stitched.

An advantage of basing the evaluation or determination of the degree or quality of alignment on the difference pattern in the static part 334 is that the evaluation or determination of a correctly aligned stitched image will not be noticed by the rest of the video system and/or the end user, since the difference pattern is zero for perfectly aligned images. If the images are not perfectly aligned the stitched image will be slightly affected by the evaluation. However, the stitching of the not perfectly aligned images would anyway generate a stitched image with stitching errors due to the misalignment and there is a need for realignment. Using embodiments herein it is possible to realign misaligned images without affecting the well-aligned images and without using a separate video stream for evaluating the alignment.

In some embodiments herein a calculation or a determination of a misalignment error is based on the difference pattern. As mentioned above in action 405 the measure of pixel difference may for example comprise a vector value comprising directional information. In some embodiments the calculation and/or determination may be performed by a neural network. For example, a pretrained neural network may be used to determine a measure of the alignment error based on the difference patterns and the original stitched image 321, 322 in the blending area 331a. For example, the pretrained neural network may use two input-tensors, one for the stitched image 321, 322, and one for the difference pattern or in other words the difference image. Based on the determined alignment error an improved alignment may be determined according to known methods. For example, for the stitched images 321, 322 there may be different alignment errors, e.g. corresponding to linear alignment errors in two directions and/or to rotational errors and/or to skews. The determination of the misalignment error may comprise determination of both a size of the error and a direction of the error, such as a direction in the plane of the image. If the alignment error is determined to be linear along a certain axis in the plane of the images, then it is possible to make a linear adjustment of the images to be stitched with an amount and direction that is based on the misalignment error. For example, if the alignment error is 5 pixels in a certain direction, then the images to be stitched may be re-aligned by re-mapping the pixels 5 pixels in the opposite direction of the alignment error, such that the alignment error vanishes.

An advantage of embodiments herein is that the evaluation of the alignment is based on information that is embedded in the stitched image stream 310c. Therefore, no separate image stream is needed for the evaluation.

A further advantage of embodiments herein is that it is possible to evaluate the alignment, e.g. by determining the misalignment error, using fewer images, e.g. from the stitched images by varying the blending instead of comparing stitched and original images.

A yet further advantage is that complex alignment errors can be modeled by more simple linear alignment errors in each static part 334.

Even though embodiments have been described above as determining local translational errors within each static part 334a, 334b the embodiments are also applicable to other alignment errors, such as rotational alignment errors. For example, a rotational error may be determined based on many local translational errors within each static part 334a, 334b. Therefore, the wording the direction of the error also comprises a rotation direction.

Action 407

If the difference pattern is above the threshold value, the method may further comprise determining or selecting a second alignment. The determination or selection of the second alignment may be done either in order to use the second alignment without further evaluation, or in order to evaluate the second alignment in a corresponding way as the first alignment was evaluated. Then action 401a and 401b above may be repeated correspondingly for the second alignment. Thus, the image-processing device 110 may align the first image frame 311a and the further first image frame 311b according to the second alignment and align the second image frame 312a and the further second image frame 312b according to the second alignment. The alignment may be done for evaluating the second alignment, e.g. by determining a degree of alignment of the second alignment.

However, in order to be able to use the above images and image streams in the video network system 250 without disturbances the first image frame 311a and the further first image frame 311b are in general not the same as used for the first alignment. Instead new image frames may be used for evaluation of the second alignment. Correspondingly, the second image frame 312a and the further second image frame 312b used for the evaluation of the second alignment will generally not be the same as the corresponding frames used for the first alignment.

Action 408

In some embodiments the image-processing device 110 selects an alignment among a plurality of alignments, based on evaluating the first alignment, e.g. based on the difference pattern or a measure thereof. In some other embodiments the image-processing device 110 determines an alignment based on evaluating the first alignment, e.g. based on the difference pattern or a measure thereof.

Selecting the alignment may comprise selecting the above-mentioned parameters of the video camera 325, such as the parameters relating to mounting positions of the sensors 301a, 301b. Further, selecting the alignment may be performed by a neural network or the like. How such selection is to be implemented based on the difference pattern is beyond the scope of embodiments herein.

As an intermediate action the evaluating may be based on the determined degree of alignment of the first alignment, which in turn may be based on the difference pattern or a measure thereof. For example, if the image-processing device 110 determines that the quality or degree of alignment of the first alignment is good enough, e.g. by determining that the difference pattern is below a threshold, then the image-processing device 110 may determine to use the first alignment among a plurality of alignments. If on the other hand the image-processing device 110 determines that the degree of alignment of the first alignment is not good enough, e.g. by determining that the difference pattern is above the threshold, then the image-processing device 110 may determine to use an alignment which is different from the first alignment among the plurality of alignments. The image-processing device 110 may for example determine to use the second alignment instead.

Action 409

In some embodiments the image-processing device 110 evaluates multiple alignments in order to determine which is the optimal alignment. The above actions 401-406 may then repeated, as explained above in relation to action 407, where a second alignment was determined or selected. Correspondingly a third alignment and so on may also be determined and evaluated and compared to the other alignments.

For example, when the second alignment has been determined or selected, the image-processing device 110 may evaluate the second alignment, e.g. by determining the degree of alignment of the second alignment, based on a second difference pattern calculated based on values of pixels of the first stitched image frame 321, obtained with the second alignment and first blending function 333b, and the second stitched image frame 322, obtained with the second alignment and second blending function. The determination of the degree of alignment of the second alignment may be done according to action 406 above. Further alignments may be evaluated in a corresponding way. In some embodiments the static part used for the calculation of the measure of pixel difference is the same for the second alignment as for the first alignment. However, a new static part, such as a second static part which differs from the at least one static part 334, may be also used to calculate the measure of pixel difference.

A neural network may be trained to evaluate the effect of the blending and iteratively test and evaluate new alignments of the images to find the best alignment, e.g., the alignment which is associated with the least change, e.g. the alignment which results in a smallest measure of the difference pattern.

Action 410

If multiple alignments have been evaluated according to the description above of action 409, then a selection of an alignment may be performed in order to select the best or optimal alignment out of the multiple alignments. The selection may be based on a minimum difference pattern out of the multiple difference patterns corresponding to the respective alignments. That is, based on which difference pattern is minimum.

For example, when the image-processing device 110 has evaluated the first and the second alignments then the image-processing device 110 may select an alignment among the first alignment and the second alignment based on the minimum difference pattern out of the first and second difference patterns.

In some embodiments the minimum difference pattern out of the first and second difference patterns comprises a minimum difference between the first blending area 331a and the second blending area 331b. That is, the minimum difference pattern out of the first and second difference patterns may comprise the minimum difference between the static part 334 of the first blending area 331a and the static part 334 of the second blending area 331b. For example, the sum of the pixel differences, and/or the sum of the average pixel difference, for all static parts 334a, 334b may be compared for each alignment.

Figure 5:
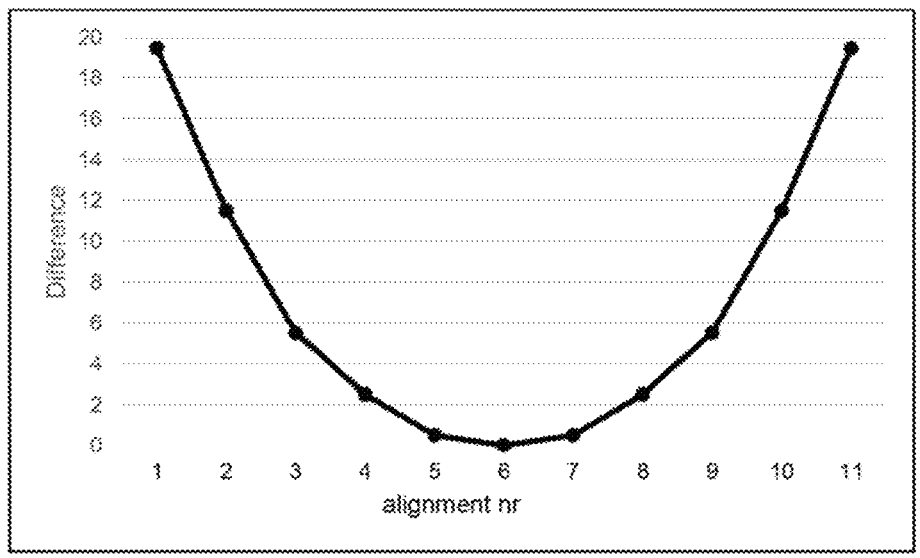
FIG. 5 illustrates a measure of difference as a function of alignment.

FIG. 5 illustrates an example graph of the measure of the difference pattern, called Difference, against different alignment options, called alignment nr. As can be seen, alignment option 6 corresponds to a zero or at least very small misalignment, since the difference is zero for alignment nr 6. The other alignment options each correspond to different misalignments, for example a linear misalignment along an axis of the image frames. As the size of the measure of the difference pattern varies with the misalignment it is possible to predict the misalignment based on the difference pattern, possibly also based on information about the direction of the misalignment. Directional information may be obtained from calculation of derivatives or differences of difference patterns e.g., difference patterns based on two or more alignments.

Figure 6:
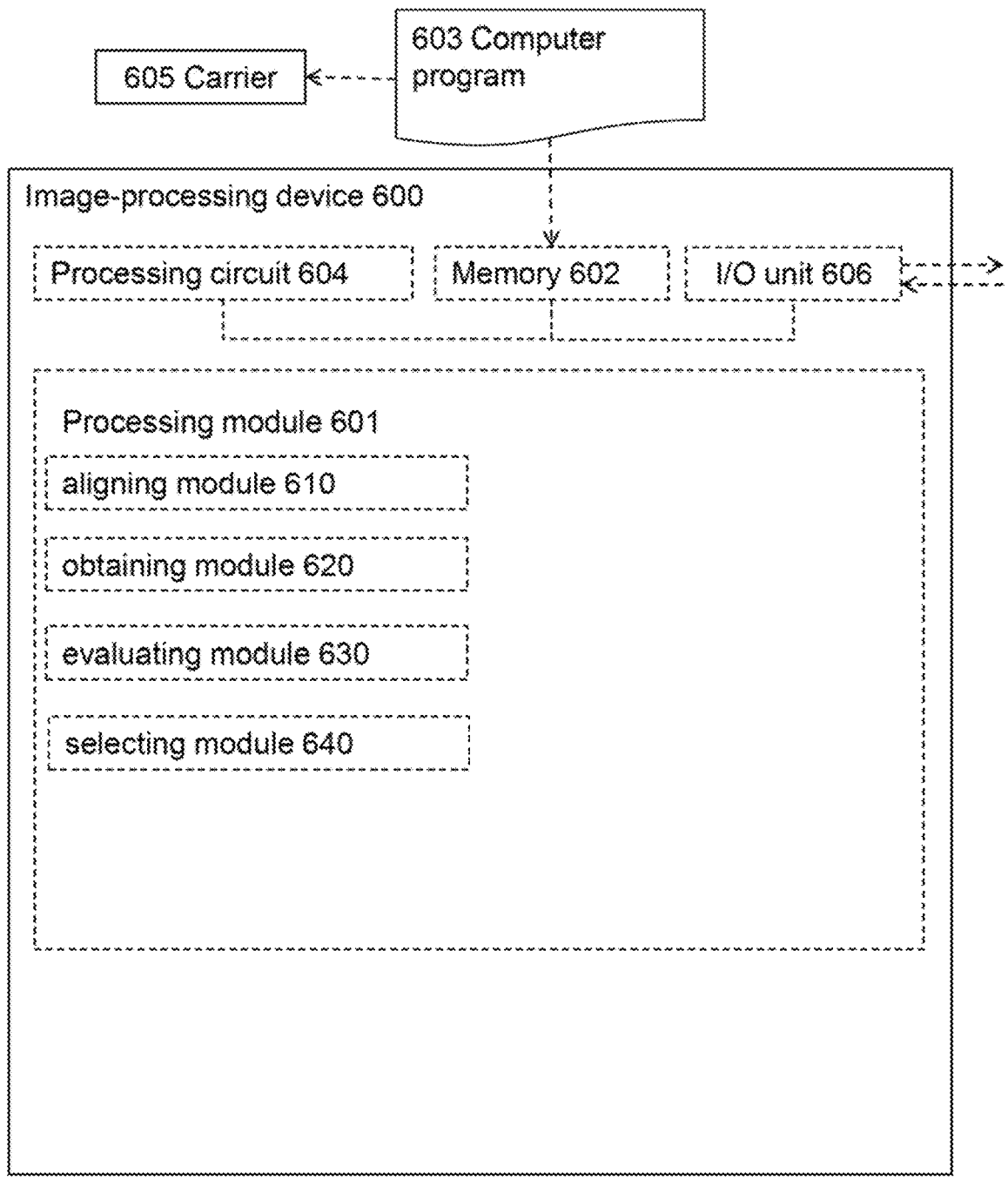
FIG. 6 is a block diagram illustrating embodiments of the image-processing device.

With reference to FIG. 6, a schematic block diagram of embodiments of an image-processing device 600 is shown. The image-processing device 600 is configured to evaluate the first alignment, i.e. the alignment of the first stream of images 310a from the first image sensor 301a and the second stream of images 310b from the second image sensor 301b. As mentioned above, the image-processing device 600 may comprise the image-capturing device 110, such as the video camera 325, a monitoring camera, a network video recorder, or a wireless communication device.

The image-processing device 600 may comprise a processing module 601, such as a means for performing the methods described herein. The means may be embodied in the form of one or more hardware modules and/or one or more software modules The image-processing device 600 may further comprise a memory 602. The memory may comprise, such as contain or store, instructions, e.g. in the form of a computer program 603, which may comprise computer readable code units which when executed on the image-processing device 600 causes the image-processing device 600 to perform the method of.

According to some embodiments herein, the image-processing device 600 and/or the processing module 601 comprises a processing circuit 604 as an exemplifying hardware module, which may comprise one or more processors. Accordingly, the processing module 601 may be embodied in the form of, or 'realized by', the processing circuit 604. The instructions may be executable by the processing circuit 604, whereby the image-processing device 600 is operative to perform the methods of FIG. 4. As another example, the instructions, when executed by the image-processing device 600 and/or the processing circuit 604, may cause the image-processing device 600 to perform the method according to FIG. 4.

In view of the above, in one example, there is provided an image-processing device 600 for evaluating the first alignment, i.e. the alignment of the first stream of images 310a from the first image sensor 301a and the second stream of images 310b from the second image sensor 301b. Again, the memory 602 contains the instructions executable by said processing circuit 604 whereby the image-processing device 600 is operative for performing the method according to FIG. 4:

Aligning the first image frame 311a of the first stream of images 310a from the first image sensor 301a and the further first image frame 311b of the second stream of images 310b from the second image sensor 301b according to the first alignment, and aligning the second image frame 312a of the first stream of images 310a and the further second image frame 312b of the second stream of images 310b according to the first alignment.

Obtaining the first stitched image frame 321 by blending the aligned first image frame 311a and further first image frame 311b in the first blending area 331a of the first and further first image frames 311a, 311b according to the first blending function, and obtaining the second stitched image frame 322 by blending the aligned second image frame 312a and the further second image frame 312b in the second blending area 331b of the second and further second image frames 312a, 312b according to the second blending function which differs from the first blending function.

Evaluating the first alignment based on the difference pattern calculated based on values of pixels of the first stitched frame 321 and the second stitched frame 322. The difference pattern is based on at least one static part 334 of the first and second blending areas 331a, 331b in the respective first and second stitched image frames 321, 322.

The image-processing device 600 may further be operative to perform the methods according to the detailed embodiments described above in connection to FIG. 4.

FIG. 6 further illustrates a carrier 605, or program carrier, which comprises the computer program 603 as described directly above. The carrier 605 may be one of an electronic signal, an optical signal, a radio signal and a computer readable medium.

In some embodiments, the image-processing device 600 and/or the processing module 601 may comprise one or more of an aligning module 610, an obtaining module 620, an evaluating module 630, and a selecting module 640, as exemplifying hardware modules. In other examples, one or more of the aforementioned exemplifying hardware modules may be implemented as one or more software modules.

Moreover, the processing module 601 may comprise an Input/Output unit 606. According to an embodiment, the Input/Output unit 606 may comprise the first and second image sensors 301a, 301b configured for capturing the image frames described above such as the first image frame 311a and the further first image frame 311b.

Accordingly, the image-processing device 600 is configured for evaluating the alignment of the first stream of images 310a from the first image sensor 301a and the second stream of images 310b from the second image sensor 301b.

Therefore, according to the various embodiments described above, the image-processing device 600 and/or the processing module 601 and/or the aligning module 6610 is configured to align the first image frame 311a of the first stream of images 310a from the first image sensor 301a and a further first image frame 311b of the second stream of images 310b from the second image sensor 301b according to the first alignment, and to align the second image frame 312a of the first stream of images 310a and the further second image frame 312b of the second stream of images 310b according to the first alignment.

The image-processing device 600 and/or the processing module 601 and/or the aligning module 610 may further be configured to align the first image frame 311a and the further first image frame 311b according to the second alignment, and align the second image frame 312a and the further second image frame 312b according to the second alignment, for evaluating the second alignment, e.g. by determining the degree of alignment of the second alignment.

The image-processing device 600 and/or the processing module 601 and/or the obtaining module 620 is configured to obtain the first stitched image frame 321 by blending the aligned first image frame 311a and further first image frame 311b in the first blending area 331a of the first and further first image frames 311a, 311b according to the first blending function 333a, and to obtain the second stitched image frame 322 by blending the aligned second image frame 312a and the further second image frame 312b in the second blending area 331b of the second and further second image frames 312a, 312b according to the second blending function 333b which differs from the first blending function 333a.

The image-processing device 600 and/or the processing module 601 and/or the evaluating module 630 may be configured to evaluate the first alignment based on the difference pattern calculated based on the values of the pixels of the first stitched frame 321 and the second stitched frame 322. The difference pattern is based on at least one static part 334 of the first and second blending areas 331a, 331b in the respective first and second stitched image frames 321, 322.

The evaluation may be performed by determining the degree of alignment of the first alignment based on the difference pattern.

The difference pattern may be calculated based on a difference between the values of corresponding pixels of the first stitched frame 321 and the second stitched frame. In some other embodiments a difference between weighted values of corresponding pixels of the first stitched frame 321 and the second stitched frame 322.

In some embodiments evaluating the first alignment based on the difference pattern comprises calculating the respective reconstruction of the first image frame 311a and the further first image frame 311b within the at least one static part 334 based on the difference pattern and further based on either of the values of corresponding pixels of the first stitched frame 321 or the second stitched frame 322, and then comparing the respective reconstruction with each other.

The image-processing device 600 and/or the processing module 601 and/or the selecting module 640 may be configured to select an alignment among a plurality of alignments, based on evaluating the first alignment. In some embodiments the image-processing device 600 and/or the processing module 601 and/or the selecting module 640 is configured to select an alignment among the first alignment and the second alignment based on the minimum difference pattern out of the first and second difference patterns.

As used herein, the term "module" may refer to one or more functional modules, each of which may be implemented as one or more hardware modules and/or one or more software modules and/or a combined software/hardware module. In some examples, the module may represent a functional unit realized as software and/or hardware.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be an aligning means, obtaining means, evaluating means, selecting means, or the like as disclosed herein. As an example, the expression "means" may be a module corresponding to the modules listed above in conjunction with the figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, Random Access Memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of number, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by an image-processing device, for evaluating alignment of a first stream of images from a first image sensor and a second stream of images from a second image sensor, wherein the first and second image sensors have overlapping fields of view, wherein the method comprises:
   aligning a first image frame of the first stream of images and a further first image frame of the second stream of images according to a first alignment,
   aligning a second image frame of the first stream of images and a further second image frame of the second stream of images according to the first alignment,
   obtaining a first stitched image frame by blending the aligned first image frame and further first image frame in a first blending area of the first and further first image frames according to a first blending function,
   obtaining a second stitched image frame by blending the aligned second image frame and the further second image frame in a second blending area of the second and further second image frames according to a second blending function, and wherein the method is characterized in:
   evaluating the first alignment based on a difference pattern calculated based on values of corresponding pixels of the first stitched frame and the second stitched frame, wherein the corresponding pixels are comprised within at least one static part of the first and second blending areas in the respective first and second stitched image frames, and wherein the method is further characterized in that:
   the second blending function differs from the first blending function, and
   the first blending function defines a respective blending weight of the aligned first image frame and the further first image frame as a function of a pixel position in the first blending area, and
   the second blending function defines a respective blending weight of the aligned second image frame and the further second image frame as a function of a pixel position in the second blending area.

2. The method according to claim 1, wherein the first and second image sensors are comprised in a same image-capturing device and wherein the first image frame and the further first image frame have been captured at the same or similar first time points and wherein the second image frame and the further second image frame have been captured at the same or similar second time points which differs from the first time points.

3. The method according to claim 1, wherein the difference pattern is calculated based on
   a. a difference between the values of corresponding pixels of the first stitched frame and the second stitched frame; and/or
   b. a difference between weighted values of corresponding pixels of the first stitched frame and the second stitched frame.

4. The method according to claim 1, wherein evaluating the first alignment based on the difference pattern comprises:
   calculating a respective reconstruction of the first image frame and the further first image frame within the at least one static part based on the difference pattern and further based on either of the values of corresponding pixels of the first stitched frame or the second stitched frame; and
   comparing the respective reconstruction with each other.

5. The method according to claim 1, wherein evaluating the first alignment based on the difference pattern comprises comparing the difference pattern with a threshold value.

6. The method according to claim 1, further comprising: selecting an alignment among a plurality of alignments, based on evaluating the first alignment.

7. The method according to claim 1, wherein the difference pattern is above a threshold value, the method further comprising:
aligning the first image frame and the further first image frame according to a second alignment, and
aligning the second image frame and the further second image frame according to the second alignment, for evaluating the second alignment.

8. The method according to claim 7, further comprising:
evaluating the second alignment based on a second difference pattern calculated based on values of pixels of the first stitched image frame, obtained with the second alignment and first blending function, and values of pixels of the second stitched image frame, obtained with the second alignment and the second blending function, and
selecting an alignment among the first alignment and the second alignment based on a minimum difference pattern out of the first and second difference patterns.

9. The method according to claim 8, wherein the minimum difference pattern out of the first and second difference patterns comprises a minimum difference between the static part of the first blending area and the static part of the second blending area.

10. The method according to claim 1, performing the method in run-time of the image-processing device.

11. An image-processing device configured to perform the method according to claim 1.

12. The image-processing device according to claim 11, comprising an image-capturing device such as any of a camera, a surveillance camera, a monitoring camera or a camcorder, a network video recorder, and a wireless communication device.

13. A non-transitory computer readable memory that contains a computer program, comprising computer readable code units which when executed on an image-processing device causes the image-processing device to perform the method according to claim 1.

* * * * *